United States Patent
Lenner et al.

(10) Patent No.: US 11,898,893 B2
(45) Date of Patent: Feb. 13, 2024

(54) TRANSDUCER FOR NON-INVASIVE MEASUREMENT

(71) Applicant: ABB Schweiz AG, Baden (CH)

(72) Inventors: Miklos Lenner, Daettwil (CH); Frank Kassubek, Rheinfelden (DE); Christof Bernhard, Aarau (CH); Detlef Pape, Nussbaumen (CH)

(73) Assignee: ABB Schweiz AG, Baden (CH)

( * ) Notice: Subject to any disclaimer, the term of this patent is extended or adjusted under 35 U.S.C. 154(b) by 432 days.

(21) Appl. No.: 17/192,917

(22) Filed: Mar. 5, 2021

(65) Prior Publication Data

US 2021/0190572 A1    Jun. 24, 2021

Related U.S. Application Data

(63) Continuation of application No. PCT/EP2019/073454, filed on Sep. 3, 2019.

(30) Foreign Application Priority Data

Sep. 6, 2018  (EP) .................... 18192918

(51) Int. Cl.
  *G01F 23/296* (2022.01)
  *B06B 1/06* (2006.01)
(52) U.S. Cl.
  CPC .......... *G01F 23/296* (2013.01); *B06B 1/0607* (2013.01)
(58) Field of Classification Search
  CPC .. G01F 23/296; G01F 23/2968; B06B 1/0607
  See application file for complete search history.

(56) References Cited

U.S. PATENT DOCUMENTS

| 4,398,421 A | * | 8/1983 | White ................... G01B 17/02 |
| | | | 73/644 |
| 4,692,654 A | | 9/1987 | Umemura et al. |
| | | | (Continued) |

FOREIGN PATENT DOCUMENTS

| EP | 0676624 | * 10/1995 |
| EP | 0676624 A2 | 10/1995 |

(Continued)

OTHER PUBLICATIONS

P. Wilcox, "Long Range Lamb Wa Ve Inspection: The Effect of Dispersion and Modal Selectivity" Review of Progress in Quantitative Nondestructive Evaluation. vol. 18, 1999, pp. 151-158, Kluwer Academic/Plenum Publishers, New York, U.S.A.

(Continued)

*Primary Examiner* — Tarun Sinha
*Assistant Examiner* — Drexel Alejandro Venero
(74) *Attorney, Agent, or Firm* — Leydig, Voit & Mayer, Ltd.

(57) ABSTRACT

A transducer for non-invasive measurement includes: at least one first piezoelectric element; a second piezoelectric element; and a base material mountable to a wall of a vessel that contains a liquid. The base material has a planar portion and an angular shaped portion. The angular shaped portion has a plurality of outer faces, a first face of the plurality of outer faces of the angular shaped portion being connected to (or part of) a first face of the planar portion, a second face of the planar portion opposite to the first face of the planar portion being mountable to the wall of the vessel, at least one second face of the plurality of outer faces of the angular shaped portion being angled to the first face of the angular shaped portion at an angle less than an angle of 90 degrees internal to the base material.

10 Claims, 4 Drawing Sheets

(56) References Cited

U.S. PATENT DOCUMENTS

| | | |
|---|---|---|
| 5,533,408 A | 7/1996 | Oldenziel et al. |
| 5,546,813 A | 8/1996 | Hastings et al. |
| 2005/0072226 A1 | 4/2005 | Pappas et al. |
| 2009/0266165 A1 | 10/2009 | Greenwood |

FOREIGN PATENT DOCUMENTS

| | | |
|---|---|---|
| EP | 1111351 A2 | 6/2001 |
| WO | WO 2016134005 A1 | 8/2016 |

OTHER PUBLICATIONS

P D. Wilcox et al., "Mode and Transducer Selection for Long Range Lamb Wave Inspection" Journal of Intelligent Material Systems and Structures, vol. 12, Aug. 2001, pp. 553-565, Sage Publications, New York, U.S.A.

* cited by examiner

TRANSDUCER FOR NON-INVASIVE MEASUREMENT

CROSS-REFERENCE TO PRIOR APPLICATION

This application is a continuation of International Patent Application No. PCT/EP2019/073454, filed on Sep. 3, 2019, which claims priority to European Patent Application No. EP 18 192 918.3, filed on Sep. 6, 2018. The entire disclosure of both applications is hereby incorporated by reference herein.

FIELD

The present invention relates to a transducer, particularly an ultrasonic transducer, for non-invasive measurement and an associated non-invasive measurement method, transducer system for non-invasive measurement and an associated non-invasive measurement method.

BACKGROUND

Industrial applications including nondestructive testing, non-invasive measurement of flow or level that use acoustic technologies require special types of ultrasonic transducers, which emit acoustic waves into the surrounding medium in a wide angular range. For level measurement applications in particular, the sensor has to be able to cover a certain span of angles, typically in the range between 0 and 70° to the normal of the tank surface. These requirements cannot be fulfilled by using a single piezoelectric element. Therefore, in order to reach a sufficiently large radiation angle range, piezoelectric phased arrays are usually employed that are driven by phase shifted electric signals—see U.S. Pat. No. 4,692,654A, WO2016134005A1, and EP0264991A1. High quality acoustic beams that show low divergences in suppressed side lobes require high number of piezoelectric elements (or a special monolithic piezo design) and complex, and thus expensive, driving electronics that generate signals with variable phase and amplitude. Electric connections between driving electronics and the piezoelectric array need to be shielded and isolated, which, given the high number of elements, require special wiring techniques and are therefore costly. Another transducer type is represented by wedge-based transducers that emit Lamb waves—see P. D. Wilcox et al., "Mode and transducer selection for long-range Lamb wave inspection", J. Int. Mat. Syst. Struct. 12 553 (2001), and EP1111351A2, the radiation angle range of these transducers is controlled by the ratio of the speed of sound of (Lamb) waves in the wall and the speed of sound in the in the medium to be proved. For example, the radiation angle from steel wall into water can be around 30° with respect to the wall normal. The radiation angle of transducers emitting longitudinal (direct) acoustic waves is typically perpendicular to the wall, however, the radiation angle is not controllable.

There is a need to provide improved techniques for non-invasive measurement that allow controlling the emission angle into the liquid over a large angular range.

SUMMARY

In an embodiment, the present invention provides a transducer for non-invasive measurement, comprising: at least one first piezoelectric element; a second piezoelectric element; and a base material configured to be mounted to a wall of a vessel that contains a liquid, the base material comprising a planar portion and an angular shaped portion, the angular shaped portion comprising a plurality of outer faces, a first face of the plurality of outer faces of the angular shaped portion being connected to (or part of) a first face of the planar portion, a second face of the planar portion opposite to the first face of the planar portion being configured to be mounted to the wall of the vessel, at least one second face of the plurality of outer faces of the angular shaped portion being angled to the first face of the plurality of outer faces of the angular shaped portion at an angle less than an angle of 90 degrees internal to the base material, wherein the at least one first piezoelectric element is mounted to at least one of the at least one second face of the plurality of outer faces of the angular shaped portion, and wherein the second piezoelectric element is mounted to the first face of the planar portion of the base material at a position adjacent to the angular shaped portion of the base material.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
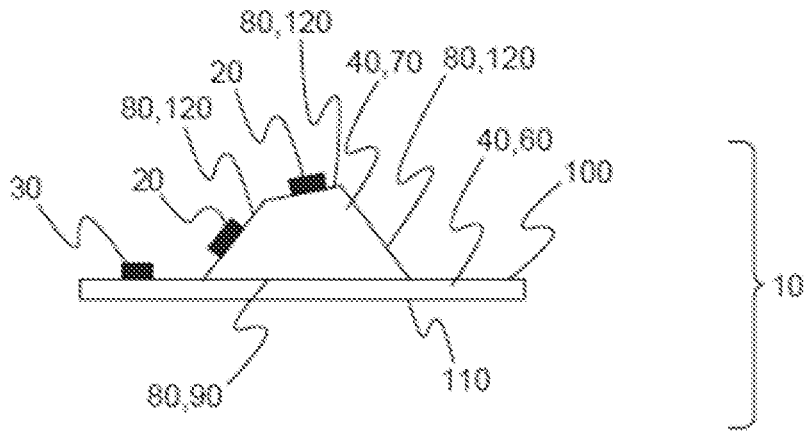
FIG. 1 shows a schematic representation of a transducer for non-invasive measurement.

In an embodiment, the present invention provides an improved transducer for non-invasive measurement and an improved non-invasive measurement method.

It should be noted that the following described aspects of the invention apply also for the transducer for non-invasive measurement, the transducer system for non-invasive measurement and for the non-invasive measurement method.

In a first aspect, there is provided a transducer for non-invasive measurement, comprising:

at least one first piezoelectric element;
a second piezoelectric element; and
a base material.

The base material is configured to be mounted to a wall of a vessel configured to contain a liquid. The term "vessel" is used here and throughout this document in a broad sense, not being limited to a closed container, but also including containers that are at least partly open, and also including tubes or plumbing or pipelines that are configured to contain or guide any kind of media, such as liquids, liquified solids or gases of all kinds.

The base material comprises a planar portion and an angular shaped portion. The angular shaped portion comprises a plurality of outer faces. A first face of the plurality of outer faces of the angular shaped portion is connected to a first face of the planar portion. A second face of the planar portion opposite to the first face of the planar portion is configured to be mounted to the wall of the vessel. At least one second face of the plurality of outer faces of the angular shaped portion is angled to the first face of the plurality of outer faces of the angular shaped portion at an angle less than 90 degrees internal to the base material. The at least one first piezoelectric element is mounted to at least one of the at least one second face of the plurality of outer faces of the angular shaped portion. The second piezoelectric element is mounted to the first face of the planar portion of the base material at a position adjacent to the angular shaped portion of the base material.

In other words, a number of piezoelectric emitters are mounted to a monolithic base element, and the angles and parameters of the emitters are optimized according to the radiation required in a liquid to be probed. An emitter mounted in a planar orientation is used primarily for the emission of waves close to the normal of the vessel wall, whilst additional ones are mounted on the angled part of the base material, which are used for the excitation of waves that are radiated under angles closer to the tangential direction. The angled part can be formed from different wedged sections, that can be optimized for different radiation angles. In this way, an overall angular range is provided. Thus, a special arrangement is provided using discrete piezo emitters in order to realise a large span of radiation angles. This combines (i) piezoelectric emitters orientated parallel or in an inclined angle ("wedge-type") to the wall surface, (ii) use of piezoelectric emitters of different size and shape, (iii) use of different acoustic modes of the piezoelectric emitters (excited by different frequencies), (iv) variation of piezo position on the transducer base, (v) choice of transducer base material.

In the present description, emission of the signal is described. Due to the linearity of the system, there is a reciprocity of the properties of emission and reception of signals—hence a good emitter is also a good receiver for respective signals. Hence the invention incorporates a system for emitting into and receiving from the liquid.

To put this in another way, a special arrangement of emitters is utilised, with individually operated emitters fixed at specific mounting angles to a single monolithic base element. The angles and the piezoelectric parameters are optimised according to the radiation angle range required. The emission process (either direct and/or Lamb wave) and the corresponding emission pattern can be chosen by switching between different emitters and operating them in an appropriate frequency range. A compact transducer design is provided, that uses simple electronics, provides improved efficiency, has high design flexibility, and provides for high robustness and reliability.

In an example, a first one of the at least one second face of the plurality of outer faces of the angular shaped portion is angled to a second one of the at least one second face of the plurality of outer faces of the angular shaped portion at an angle greater than an angle of 90 degrees internal to the base material.

In an example, the first one of the at least one second face of the plurality of outer faces of the angular shaped portion is angled to the second one of the at least one second face of the plurality of outer faces of the angular shaped portion at an angle greater than an angle of 180 degrees internal to the base material.

In an example, the first one of the at least one second face of the plurality of outer faces of the angular shaped portion is contiguous with the second one of the at least one second face of the plurality of outer faces of the angular shaped portion.

In an example, the first one of the at least one second face of the plurality of outer faces of the angular shaped portion is contiguous with the first face of the plurality of outer faces of the angular shaped portion.

In an example, a first one of the at least one first piezoelectric element is mounted to the first one of the at least one second face of the plurality of outer faces of the angular shaped portion and a second one of the at least one first piezoelectric element is mounted to the second one of the at least one second face of the plurality of outer faces of the angular shaped portion.

In an example, the first one of the at least one second face of the plurality of outer faces of the angular shaped portion is on a side of the angular shaped portion adjacent to the position at which the second piezoelectric element is mounted to the planar portion.

In an example, a third one of the at least one second face of the plurality of outer faces of the angular shaped portion is angled to a fourth one of the at least one second face of the plurality of outer faces of the angular shaped portion at an angle greater than an angle of 90 degrees internal to the base material.

In an example, the third one of the at least one second face of the plurality of outer faces of the angular shaped portion is angled to the fourth one of the at least one second face of the plurality of outer faces of the angular shaped portion at an angle greater than an angle of 180 degrees internal to the base material.

In an example, the third one of the at least one second face of the plurality of outer faces of the angular shaped portion is contiguous with the fourth one of the at least one second face of the plurality of outer faces of the angular shaped portion.

In an example, the third one of the at least one second face of the plurality of outer faces of the angular shaped portion is contiguous with the first face of the plurality of outer faces of the angular shaped portion.

In an example, a third one of the at least one first piezoelectric element is mounted to the third one of the at least one second face of the plurality of outer faces of the angular shaped portion.

In an example, a fourth one of the at least one first piezoelectric element is mounted to the fourth one of the at least one second face of the plurality of outer faces of the angular shaped portion.

In a second aspect, a non-invasive measurement method is provided, comprising:
  a) mounting a base material to a wall of a vessel containing a liquid,
  wherein, the base material comprises a planar portion and an angular shaped portion, wherein, the angular shaped portion comprises a plurality of outer faces, wherein, a first face of the plurality of outer faces of the angular shaped portion is connected to a first face of the planar portion, wherein a second face of the planar portion opposite to the first face of the planar portion is mounted to the wall of the vessel, wherein, at least one second face of the plurality of outer faces of the angular shaped portion is angled to the first face of the plurality of outer faces of the angular shaped portion at an angle less than an angle of 90 degrees internal to the base material, wherein, at least one first piezoelectric element is mounted to at least one of the at least one second face of the plurality of outer faces of the angular shaped portion; and wherein, a second piezoelectric element is mounted to the first face of the planar portion of the base material at a position adjacent to the angular shaped portion of the base material; and b) activating (220) the at least one first piezoelectric element and the second piezoelectric element.

In a third aspect, there is provided a transducer system for non-invasive measurement, comprising:

at least one first piezoelectric element (310)
a second piezoelectric element (320); and
a base material (330);

The base material comprises a plurality of outer faces. A first face of the plurality of outer faces is mounted to a wall of a vessel configured to hold a liquid. At least one second face of the plurality of outer faces is angled to the first face at an angle less than an angle of 90 degrees internal to the base material. The at least one first piezoelectric element is mounted to at least one of the at least one second face. The second piezoelectric element is mounted to the wall of the vessel at a position adjacent to the base material.

In other words, rather than having a base material with a planar part and an angled part, with a piezoelectric emitter mounted to the planar part (as well as to the angled part), a piezoelectric emitter mounted to the planar part can also be mounted to the wall of the vessel as a separate unit. In addition, a piezoelectric emitter can either be directly mounted to the wall or mounted via a separate planar base material. This allows for greater flexibility as to the exact mounting position of the piezoelectric emitters.

In an example, the second piezoelectric element is mounted to the wall of the vessel via an intermediate planar base material. The second piezoelectric element is mounted to a first surface of the planar base material and a second face of the planar base material parallel to the first surface of the planar base material is mounted to the wall of the vessel.

In an example, a first one of the at least one second face is angled to a second one of the at least one second face at an angle greater than an angle of 90 degrees internal to the base material.

In an example, the first one of the at least one second face is angled to the second one of the at least one second face at an angle greater than an angle of 180 degrees internal to the base material.

In an example, the first one of the at least one second face is contiguous with the second one of the at least one second face.

In an example, the first one of the at least one second face is contiguous with the first face.

In an example, a first one of the at least one first piezoelectric element is mounted to the first one of the at least one second face and a second one of the at least one first piezoelectric element is mounted to the second one of the at least one second face.

In an example, the first one of the at least one second face of the plurality of outer faces of the angular shaped portion is on a side of the angular shaped portion adjacent to the position at which the second piezoelectric element is mounted to the planar portion.

In an example, a third one of the at least one second face of the plurality of outer faces of the angular shaped portion is angled to a fourth one of the at least one second face of the plurality of outer faces of the angular shaped portion at an angle greater than an angle of 90 degrees internal to the base material.

In an example, the third one of the at least one second face of the plurality of outer faces of the angular shaped portion is angled to the fourth one of the at least one second face of the plurality of outer faces of the angular shaped portion at an angle greater than an angle of 180 degrees internal to the base material.

In an example, the third one of the at least one second face of the plurality of outer faces of the angular shaped portion is contiguous with the fourth one of the at least one second face of the plurality of outer faces of the angular shaped portion.

In an example, the third one of the at least one second face of the plurality of outer faces of the angular shaped portion is contiguous with the first face of the plurality of outer faces of the angular shaped portion.

In an example, a third one of the at least one first piezoelectric element is mounted to the third one of the at least one second face of the plurality of outer faces of the angular shaped portion.

In an example, a fourth one of the at least one first piezoelectric element is mounted to the fourth one of the at least one second face of the plurality of outer faces of the angular shaped portion.

In a fourth aspect, there is provided a non-invasive measurement method, comprising:

a) mounting a base material to a wall of a vessel containing a liquid, wherein the base material comprises a plurality of outer faces, wherein a first face of the plurality of outer faces is mounted to the wall of the vessel, wherein at least one second face of the plurality of outer faces is angled to the first face at an angle less than an angle of 90 degrees internal to the base material, and wherein at least one first piezoelectric element is mounted to at least one of the at least one second face;

b) mounting a second piezoelectric element to the wall of the vessel at a position adjacent to the base material; and c) activating the at least one first piezoelectric element and the second piezoelectric element.

The above aspects and examples will become apparent from and be elucidated with reference to the embodiments described hereinafter.

FIG. 1 shows an example of a transducer 10 for non-invasive measurement. The transducer comprises at least one first piezoelectric element 20, a second piezoelectric element 30, and a base material 40. The base material is configured to be mounted to a wall 50 of a vessel configured to contain a liquid.

The term "vessel" is used here and throughout this document in a broad sense, not being limited to a closed container, but also including containers that are at least partly open, and also including tubes or plumbing or pipelines that are configured to contain or guide any kind of media, such as liquids, liquified solids or gases of all kinds.

The base material comprises a planar portion 60 and an angular shaped portion 70. The angular shaped portion comprises a plurality of outer faces 80. In the exemplary embodiment shown here, a first face 90 of the plurality of outer faces of the angular shaped portion is connected to (or joined to) a first face 100 of the planar portion. In general, the angular-shape and the planar portions form physically the same unit. Typically, they are made from the same piece of material, i.e. there are embodiments possible where no "connection" as such is needed. A second face 110 of the planar portion opposite to the first face of the planar portion is configured to be mounted to the wall of the vessel. At least one second face 120 of the plurality of outer faces of the angular shaped portion is angled to the first face of the plurality of outer faces of the angular shaped portion at an angle less than an angle of 90 degrees internal to the base material. The at least one first piezoelectric element is mounted to at least one of the at least one second face of the plurality of outer faces of the angular shaped portion. The second piezoelectric element is mounted to the first face of the planar portion of the base material at a position adjacent to the angular shaped portion of the base material.

In other words, the setup is as follows: a transducer body with (multiple) faces is aligned to a direction perpendicular to the measurement direction. The normal of these faces to the normal of the wall is between 0 (planar case) and <90 degrees. Piezo elements which are generating ultrasonic beams are mounted on these faces. The system has at least two different phases with different angles, and possibly different distance between piezo and wall, allowing to generate different radiation patterns in the liquid.

Figure 6:
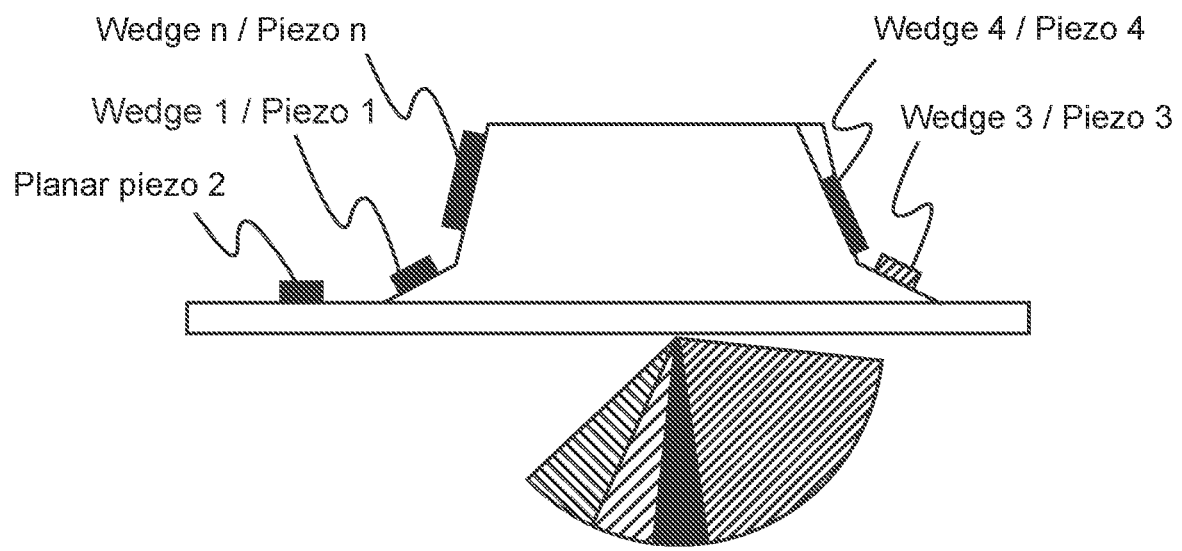
FIG. 6 shows an example of the transducer of FIG. 1.
Figure 7:
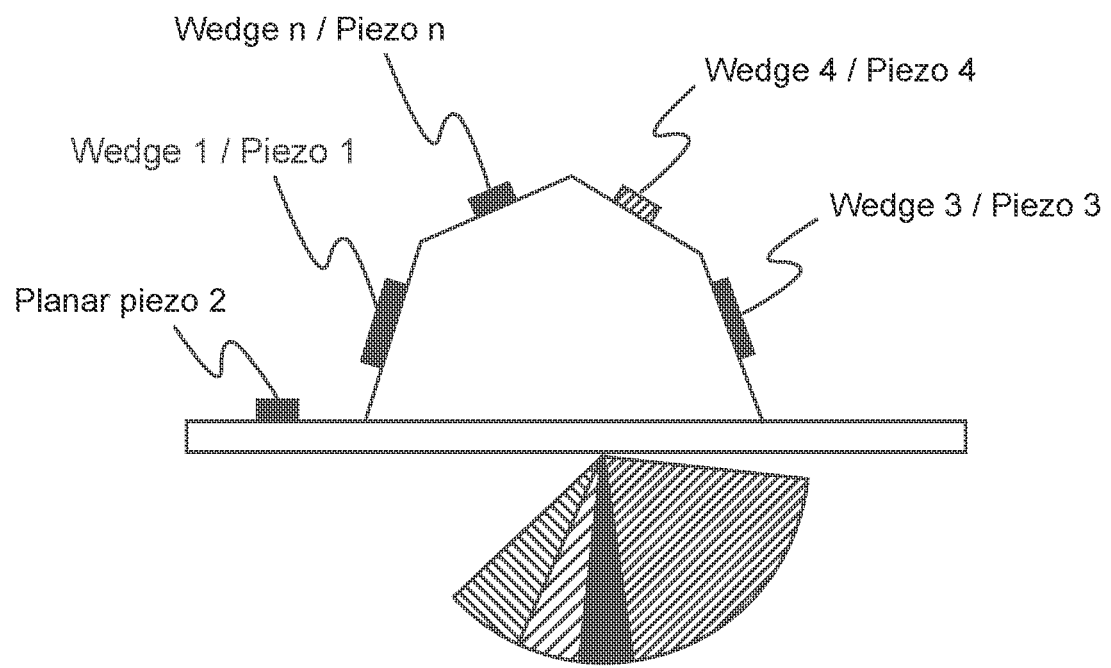
FIG. 7 shows an example of the transducer of FIG. 1.

In an example, various shaped designs can be provided: a) simple (FIG. 5); b) hat (FIG. 6); and c) tent (FIG. 7).

According to an example, a first one of the at least one second face of the plurality of outer faces of the angular shaped portion is angled to a second one of the at least one second face of the plurality of outer faces of the angular shaped portion at an angle greater than an angle of 90 degrees internal to the base material.

According to an example, the first one of the at least one second face of the plurality of outer faces of the angular shaped portion is angled to the second one of the at least one second face of the plurality of outer faces of the angular shaped portion at an angle greater than an angle of 180 degrees internal to the base material.

According to an example, the first one of the at least one second face of the plurality of outer faces of the angular shaped portion is contiguous with the second one of the at least one second face of the plurality of outer faces of the angular shaped portion.

According to an example, the first one of the at least one second face of the plurality of outer faces of the angular shaped portion is contiguous with the first face of the plurality of outer faces of the angular shaped portion.

According to an example, a first one of the at least one first piezoelectric element is mounted to the first one of the at least one second face of the plurality of outer faces of the angular shaped portion and a second one of the at least one first piezoelectric element is mounted to the second one of the at least one second face of the plurality of outer faces of the angular shaped portion.

According to an example, the first one of the at least one second face of the plurality of outer faces of the angular shaped portion is on a side of the angular shaped portion adjacent to the position at which the second piezoelectric element is mounted to the planar portion.

According to an example, a third one of the at least one second face of the plurality of outer faces of the angular shaped portion is angled to a fourth one of the at least one second face of the plurality of outer faces of the angular shaped portion at an angle greater than an angle of 90 degrees internal to the base material.

According to an example, the third one of the at least one second face of the plurality of outer faces of the angular shaped portion is angled to the fourth one of the at least one second face of the plurality of outer faces of the angular shaped portion at an angle greater than an angle of 180 degrees internal to the base material.

According to an example, the third one of the at least one second face of the plurality of outer faces of the angular shaped portion is contiguous with the fourth one of the at least one second face of the plurality of outer faces of the angular shaped portion.

According to an example, the third one of the at least one second face of the plurality of outer faces of the angular shaped portion is contiguous with the first face of the plurality of outer faces of the angular shaped portion.

According to an example, a third one of the at least one first piezoelectric element is mounted to the third one of the at least one second face of the plurality of outer faces of the angular shaped portion.

According to an example, a fourth one of the at least one first piezoelectric element is mounted to the fourth one of the at least one second face of the plurality of outer faces of the angular shaped portion.

Figure 2:
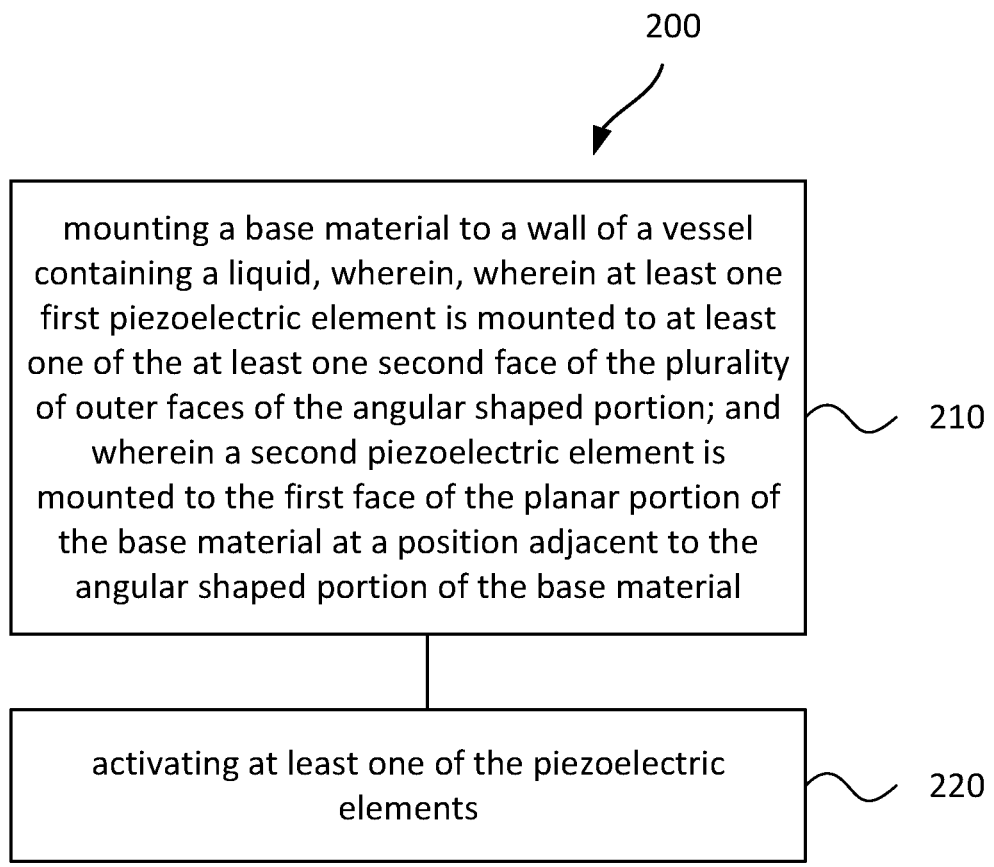
FIG. 2 shows a non-invasive measurement method.

FIG. 2 shows a non-invasive measurement method 200, comprising:

in a mounting step 210, also referred to as step a), mounting a base material to a wall of a vessel containing a liquid, wherein, the base material comprises a planar portion and an angular shaped portion, wherein, the angular shaped portion comprises a plurality of outer faces, wherein, a first face of the plurality of outer faces of the angular shaped portion is connected to—or physically part of—a first face of the planar portion, wherein a second face of the planar portion opposite to the first face of the planar portion is mounted to the wall of the vessel, wherein, at least one second face of the plurality of outer faces of the angular shaped portion is angled to the first face of the plurality of outer faces of the angular shaped portion at an angle less than an angle of 90 degrees internal to the base material, wherein, at least one first piezoelectric element is mounted to at least one of the at least one second face of the plurality of outer faces of the angular shaped portion; and wherein, a second piezoelectric element is mounted to the first face of the planar portion of the base material at a position adjacent to the angular shaped portion of the base material; and in an activating step 220, also referred to as step b), activating at least one of the piezoelectric elements.

In an example, a first one of the at least one second face of the plurality of outer faces of the angular shaped portion is angled to a second one of the at least one second face of the plurality of outer faces of the angular shaped portion at an angle greater than an angle of 90 degrees internal to the base material.

In an example, the first one of the at least one second face of the plurality of outer faces of the angular shaped portion is angled to the second one of the at least one second face of the plurality of outer faces of the angular shaped portion at an angle greater than an angle of 180 degrees internal to the base material.

In an example, the first one of the at least one second face of the plurality of outer faces of the angular shaped portion is contiguous with the second one of the at least one second face of the plurality of outer faces of the angular shaped portion.

In an example, the first one of the at least one second face of the plurality of outer faces of the angular shaped portion is contiguous with the first face of the plurality of outer faces of the angular shaped portion.

In an example, a first one of the at least one first piezoelectric element is mounted to the first one of the at least one second face of the plurality of outer faces of the angular shaped portion and a second one of the at least one first piezoelectric element is mounted to the second one of the at least one second face of the plurality of outer faces of the angular shaped portion.

In an example, the first one of the at least one second face of the plurality of outer faces of the angular shaped portion is on a side of the angular shaped portion adjacent to the position at which the second piezoelectric element is mounted to the planar portion.

In an example, a third one of the at least one second face of the plurality of outer faces of the angular shaped portion is angled to a fourth one of the at least one second face of the plurality of outer faces of the angular shaped portion at an angle greater than an angle of 90 degrees internal to the base material.

In an example, the third one of the at least one second face of the plurality of outer faces of the angular shaped portion is angled to the fourth one of the at least one second face of the plurality of outer faces of the angular shaped portion at an angle greater than an angle of 180 degrees internal to the base material.

In an example, the third one of the at least one second face of the plurality of outer faces of the angular shaped portion is contiguous with the fourth one of the at least one second face of the plurality of outer faces of the angular shaped portion.

In an example, the third one of the at least one second face of the plurality of outer faces of the angular shaped portion is contiguous with the first face of the plurality of outer faces of the angular shaped portion.

In an example, a third one of the at least one first piezoelectric element is mounted to the third one of the at least one second face of the plurality of outer faces of the angular shaped portion.

In an example, a fourth one of the at least one first piezoelectric element is mounted to the fourth one of the at least one second face of the plurality of outer faces of the angular shaped portion.

Figure 3:
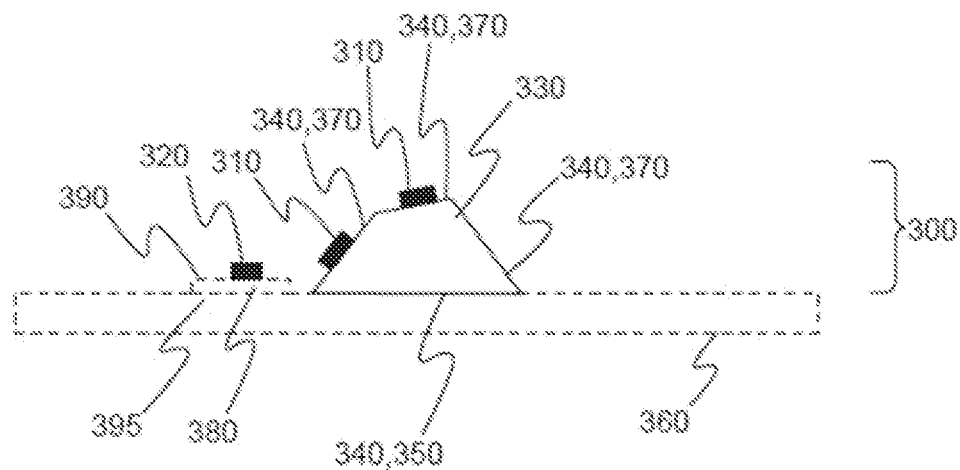
FIG. 3 shows a schematic representation of a transducer system for non-invasive measurement.

FIG. 3 shows an example of a transducer system 300 for non-invasive measurement. The transducer system comprises at least one first piezoelectric element 310, a second piezoelectric element 320, and a base material. The base material comprises a plurality of outer faces 340. A first face 350 of the plurality of outer faces is mounted to a wall 360 of a vessel configured to hold a liquid. At least one second face 370 of the plurality of outer faces is angled to the first face at an angle less than an angle of 90 degrees internal to the base material. The at least one first piezoelectric element is mounted to at least one of the at least one second face. The second piezoelectric element is mounted to the wall of the vessel at a position adjacent to the base material.

According to an example, the second piezoelectric element is mounted to the wall of the vessel via and intermediate planar base material 380, wherein the second piezoelectric element is mounted to a first surface 390 of the planar base material and a second face 395 of the planar base material parallel to the first surface of the planar base material is mounted to the wall of the vessel.

According to an example, a first one of the at least one second face is angled to a second one of the at least one second face at an angle greater than an angle of 90 degrees internal to the base material.

According to an example, the first one of the at least one second face is angled to the second one of the at least one second face at an angle greater than an angle of 180 degrees internal to the base material.

According to an example, the first one of the at least one second face is contiguous with the second one of the at least one second face.

According to an example, the first one of the at least one second face is contiguous with the first face.

According to an example, a first one of the at least one first piezoelectric element is mounted to the first one of the at least one second face and a second one of the at least one first piezoelectric element is mounted to the second one of the at least one second face.

According to an example, the first one of the at least one second face of the plurality of outer faces of the angular shaped portion is on a side of the angular shaped portion adjacent to the position at which the second piezoelectric element is mounted to the planar portion.

According to an example, a third one of the at least one second face of the plurality of outer faces of the angular shaped portion is angled to a fourth one of the at least one second face of the plurality of outer faces of the angular shaped portion at an angle greater than an angle of 90 degrees internal to the base material.

According to an example, the third one of the at least one second face of the plurality of outer faces of the angular shaped portion is angled to the fourth one of the at least one second face of the plurality of outer faces of the angular shaped portion at an angle greater than an angle of 180 degrees internal to the base material.

According to an example, the third one of the at least one second face of the plurality of outer faces of the angular shaped portion is contiguous with the fourth one of the at least one second face of the plurality of outer faces of the angular shaped portion.

According to an example, the third one of the at least one second face of the plurality of outer faces of the angular shaped portion is contiguous with the first face of the plurality of outer faces of the angular shaped portion.

According to an example, a third one of the at least one first piezoelectric element is mounted to the third one of the at least one second face of the plurality of outer faces of the angular shaped portion.

According to an example, a fourth one of the at least one first piezoelectric element is mounted to the fourth one of the at least one second face of the plurality of outer faces of the angular shaped portion.

Figure 4:
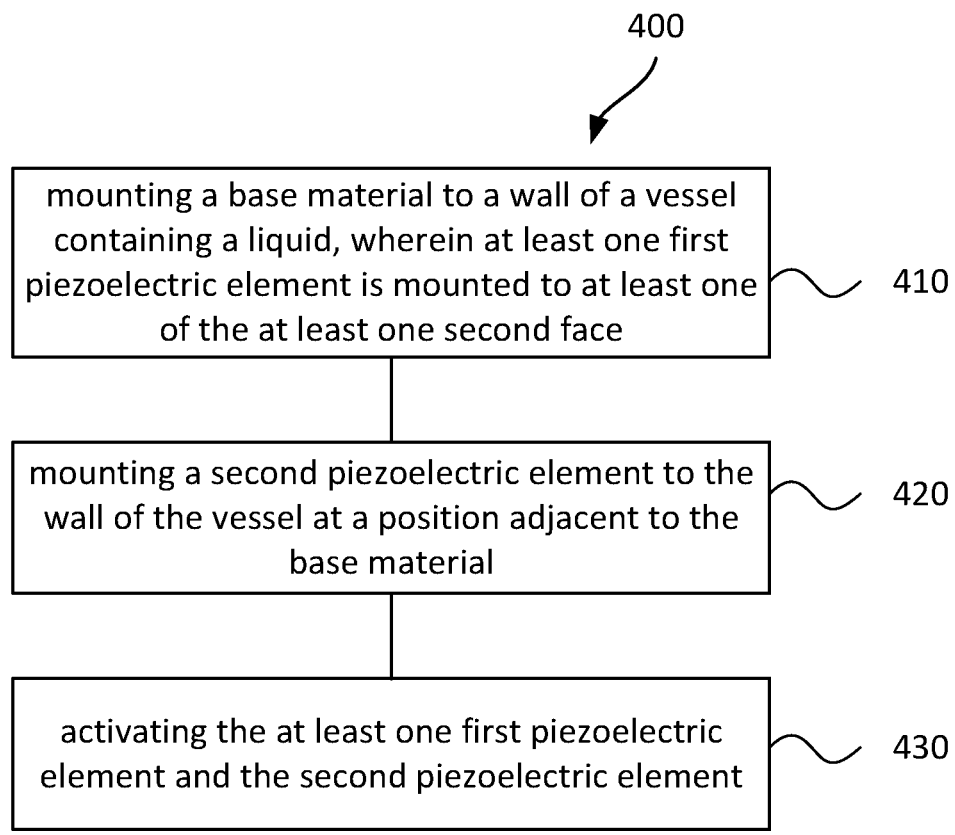
FIG. 4 shows a non-invasive measurement method.

FIG. 4 shows a non-invasive measurement method 400, comprising:

in a mounting step 410, also referred to as step a), mounting a base material to a wall of a vessel containing a liquid, wherein the base material comprises a plurality of outer faces, wherein a first face of the plurality of outer faces is mounted to the wall of the vessel, wherein at least one second face of the plurality of outer faces is angled to the first face at an angle less than an angle of 90 degrees internal to the base material, and wherein at least one first piezoelectric element is mounted to at least one of the at least one second face;

in a mounting step 420, also referred to as step b), mounting a second piezoelectric element to the wall of the vessel at a position adjacent to the base material; and in an activating step 430, also referred to as step c), activating the at least one first piezoelectric element and the second piezoelectric element.

In an example, a first one of the at least one second face is angled to a second one of the at least one second face at an angle greater than an angle of 90 degrees internal to the base material.

In an example, the first one of the at least one second face is angled to the second one of the at least one second face at an angle greater than an angle of 180 degrees internal to the base material.

In an example, the first one of the at least one second face is contiguous with the second one of the at least one second face.

In an example, the first one of the at least one second face is contiguous with the first face.

In an example, a first one of the at least one first piezoelectric element is mounted to the first one of the at least one second face and a second one of the at least one first piezoelectric element is mounted to the second one of the at least one second face.

In an example, the first one of the at least one second face of the plurality of outer faces of the angular shaped portion is on a side of the angular shaped portion adjacent to the position at which the second piezoelectric element is mounted to the planar portion.

In an example, a third one of the at least one second face of the plurality of outer faces of the angular shaped portion is angled to a fourth one of the at least one second face of the plurality of outer faces of the angular shaped portion at an angle greater than an angle of 90 degrees internal to the base material.

In an example the third one of the at least one second face of the plurality of outer faces of the angular shaped portion is angled to the fourth one of the at least one second face of the plurality of outer faces of the angular shaped portion at an angle greater than an angle of 180 degrees internal to the base material.

In an example, the third one of the at least one second face of the plurality of outer faces of the angular shaped portion is contiguous with the fourth one of the at least one second face of the plurality of outer faces of the angular shaped portion.

In an example, the third one of the at least one second face of the plurality of outer faces of the angular shaped portion is contiguous with the first face of the plurality of outer faces of the angular shaped portion.

In an example, a third one of the at least one first piezoelectric element is mounted to the third one of the at least one second face of the plurality of outer faces of the angular shaped portion.

In an example, a fourth one of the at least one first piezoelectric element is mounted to the fourth one of the at least one second face of the plurality of outer faces of the angular shaped portion.

The transducer for non-invasive measurement and non-invasive measurement method are now described in more detail with reference to FIGS. 5-7.

Figure 5:
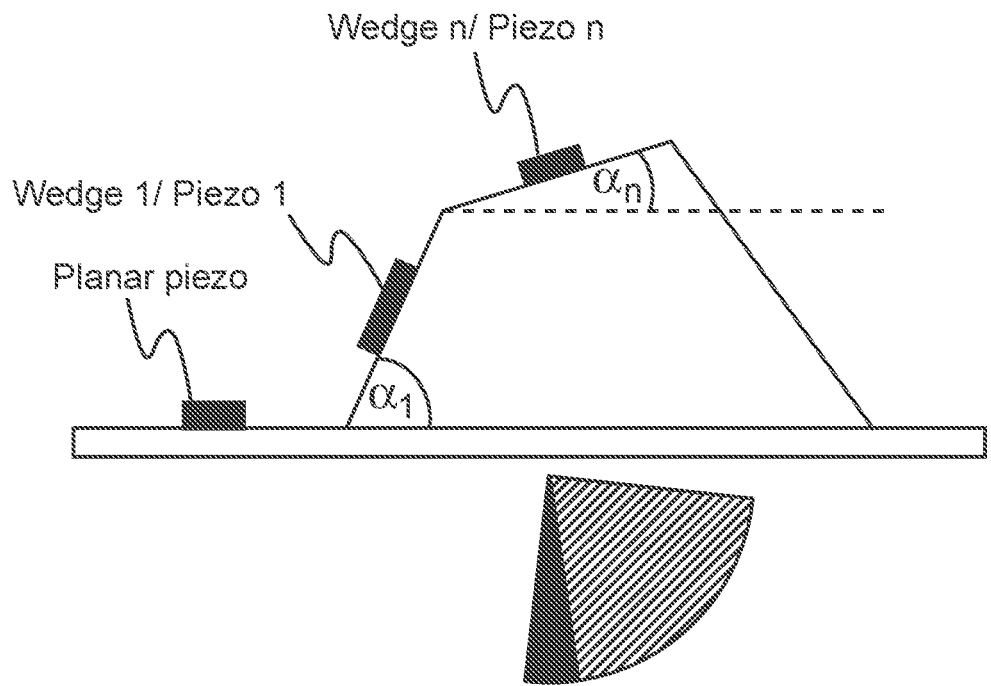
FIG. 5 shows an example of the transducer of FIG. 1.

FIG. 5 shows a simple combined transducer design, which is a detailed example of the transducer shown in FIG. 1. FIG. 6 shows a hat transducer design, which is a detailed example of the transducer shown in FIG. 1. FIG. 7 shows a tent transducer design, which is a detailed example of the transducer shown in FIG. 1. In all three figures, the corresponding acoustic radiation angle ranges are shown. For these transducers, a number of discrete piezoelectric elements are placed on a single monolithic transducer base element. The individually operated emitters generate transversal or longitudinal waves that are emitted in a certain angular range and produce different emission cones in the medium. The transducers are mounted to a wall of a vessel that contains the medium, for example a liquid that is not shown in these figures. The combination of all the cones of radiation produced by individual emitters account for the total angular span of the transducer. The emitter(s) placed or mounted on the planar part of the base material are used primarily for the emission of longitudinal (or direct) waves. However, as detailed in the description associated with FIGS. 3-4, the planar part need not be part of the monolithic base element, and can be separately mounted to the vessel wall, via an intermediate separate base material if necessary. Also, although in the general discussion it is described that only one emitter is mounted on the planar part of the base material, more than one emitter can be mounted to the planar part of the base material or more than one emitter can be mounted separately to the angular base material. Continuing with the planar mounted emitter shown in FIGS. 5-7, the piezoelectric emitter is operated preferably at its thickness resonance in order to generate longitudinal waves, which propagate through the base plate and excite acoustic waves in the surrounding medium. These waves propagate (close to) normal to the vessel wall.

The emitter(s) mounted on the wedged part of the base material are used for the excitation of Lamb-modes in order to excite acoustic waves in the angle range of about 30° to 90° with respect to the wall normal in the liquid—these angles for leaky Lamb waves depend (due to the dispersion of the Lamb waves) on frequency. The optimal coupling angle (angle of the incoming ray on the transducer side to the wall normal) is determined by the propagation speed of the Lamb mode in the wall, and the sound speed in the base material. Hence, the coupling angle is chosen such that it fulfils this condition for the frequency corresponding to the desired emission angle into the liquid. If the desired angle changes, a different coupling angle—and hence angular orientation of the emitting face—has to be chosen—this is why it can be necessary to use multiple piezoelectric elements also for covering the angular region to be covered by the Lamb wave emission.

In other words, the different piezoelectric elements emitting from different phases cover different angular ranges. By a clever combination of piezo types and angles, one can cover the full angular range.

The distance between the emitter and the wall determines the size of the irradiated surface on the wall and allows the control of the beam divergence. For the choice of the base material, two criteria must be fulfilled: a) the sound speed of the appropriate acoustic mode (longitudinal or transversal) must be lower than that of the medium; and b) the acoustic damping should be sufficiently high in order to avoid unwanted acoustic radiation due to internal reflections. The skilled person would be aware of the appropriate materials.

Having several piezoelectric elements on the transducer base allows for the following additional functions: a) determination of the transducer internal propagation time, which results in improved measurement accuracy; b) redundant level measurement with several piezoelectric elements; and c) functionality check of the system, which results in improved reliability.

It must be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A transducer for non-invasive measurement, comprising:
  a first piezoelectric element;
  a second piezoelectric element;
  a third piezoelectric element;
  a fourth piezoelectric element; and
  a base material configured to be mounted to a wall of a vessel that contains a liquid, the base material comprising a planar portion and an angular shaped portion, the angular shaped portion comprising a plurality of outer faces, including a first face and a plurality of second faces, the first face of the plurality of outer faces of the angular shaped portion being connected to a first face of the planar portion, a second face of the planar portion opposite to the first face of the planar portion being configured to be mounted to the wall of the vessel,
  wherein a first one of the plurality of second faces is contiguous and angled to the first face of the plurality of outer faces of the angular shaped portion at an angle less than an angle of 90 degrees internal to the base material, and is angled to a second one of the plurality of second faces at an angle greater than an angle of 90 degrees internal to the base material,
  wherein a third one of the plurality of second faces is contiguous and angled to the first face of the plurality of outer faces of the angular shaped portion at an angle less than an angle of 90 degrees internal to the base material, and is angled to a fourth one of the plurality of second faces at an angle greater than an angle of 90 degrees internal to the base material,
  wherein the first piezoelectric element is mounted to the first one of the plurality of second faces,
  wherein the third piezoelectric element is mounted to the third one of the plurality of second faces,
  wherein the fourth piezoelectric element is mounted to the fourth one of the plurality of second faces, and
  wherein the second piezoelectric element is mounted to the first face of the planar portion of the base material at a position adjacent to the angular shaped portion of the base material.

2. The transducer according to claim 1, wherein the first one of the plurality of second faces is angled to the second one of the plurality of second faces at an angle greater than an angle of 180 degrees internal to the base material.

3. The transducer according to claim 1, wherein the first one of the plurality of second faces is contiguous with the second one of the plurality of second faces.

4. The transducer according to claim 1, wherein the first one of the plurality of second faces is on a side of the angular shaped portion adjacent to a position of the second piezoelectric element.

5. The transducer according to claim 1, wherein the third one of the plurality of second faces is angled to the fourth one of the plurality of second faces at an angle greater than an angle of 180 degrees internal to the base material.

6. A non-invasive measurement method, comprising:
  a) mounting a base material to a wall of a vessel containing a liquid, the base material comprising a planar portion and an angular shaped portion, the angular shaped portion comprising a plurality of outer faces, a first face of the plurality of outer faces of the angular shaped portion being connected to a first face of the planar portion, a second face of the planar portion opposite to the first face of the planar portion being mounted to the wall of the vessel,
    wherein the plurality of outer faces of the angular shaped portion comprises a plurality of second faces,
    wherein a first one of the plurality of second faces is contiguous and angled to the first face of the plurality of outer faces of the angular shaped portion at an angle less than an angle of 90 degrees internal to the base material, and is angled to a second one of the plurality of second faces at an angle greater than an angle of 90 degrees internal to the base material,
    wherein a third one of the plurality of second faces is contiguous and angled to the first face of the plurality of outer faces of the angular shaped portion at an angle less than an angle of 90 degrees internal to the base material, and is angled to a fourth one of the plurality of second faces at an angle greater than an angle of 90 degrees internal to the base material,
    wherein a first piezoelectric element is mounted to the first one of the plurality of second faces,
    wherein a third piezoelectric element is mounted to the third one of the plurality of second faces,
    wherein a fourth piezoelectric element is mounted to the fourth one of the plurality of second faces, and wherein a second piezoelectric element is mounted to the first face of the planar portion of the base material at a position adjacent to the angular shaped portion of the base material; and b) activating the first piezoelectric element the second piezoelectric element, the third piezoelectric element, and the fourth piezoelectric element.

7. A transducer system for non-invasive measurement, comprising:
   a first piezoelectric element;
   a second piezoelectric element;
   a third piezoelectric element;
   a fourth piezoelectric element, and
   a base material comprising a plurality of outer faces, including a first face and a plurality of second faces, the first face being mounted to a wall of a vessel that contains a liquid,
   wherein a first one of the plurality of second faces is contiguous and angled to the first face at an angle less than an angle of 90 degrees internal to the base material, and is angled to a second one of the plurality of second faces at an angle greater than an angle of 90 degrees internal to the base material,
   wherein a third one of the plurality of second faces is contiguous and angled to the first face at an angle less than an angle of 90 degrees internal to the base material, and is angled to a fourth one of the plurality of second faces at an angle greater than an angle of 90 degrees internal to the base material,
   wherein the first piezoelectric element is mounted to the first one of the plurality of second faces,
   wherein the third piezoelectric element is mounted to the third one of the plurality of second faces,
   wherein the fourth piezoelectric element is mounted to the fourth one of the plurality of second faces, and
   wherein the second piezoelectric element is mounted to the wall of the vessel at a position adjacent to the base material.

8. The transducer system according to claim 7, wherein the second piezoelectric element is mounted to the wall of the vessel via an intermediate planar base material, and wherein the second piezoelectric element is mounted to a first surface of the planar base material and a second face of the planar base material parallel to the first surface of the planar base material is mounted to the wall of the vessel.

9. The transducer system according to claim 7, wherein the first one of the plurality of second faces is angled to the second one of the at least one second face plurality of second faces at an angle greater than an angle of 180 degrees internal to the base material.

10. A non-invasive measurement method, comprising:
   a) mounting a base material to a wall of a vessel containing a liquid, the base material comprising a plurality of outer faces, including a first face and a plurality of second faces, the first face being mounted to the wall of the vessel,
   wherein a first one of the plurality of second faces is contiguous and angled to the first face at an angle less than an angle of 90 degrees internal to the base material, and is angled to a second one of the plurality of second faces at an angle greater than an angle of 90 degrees internal to the base material,
   wherein a third one of the plurality of second faces is contiguous and angled to the first face at an angle less than an angle of 90 degrees internal to the base material, and is angled to a fourth one of the plurality of second faces at an angle greater than an angle of 90 degrees internal to the base material,
   wherein a first piezoelectric element is mounted to the first one of the plurality of second faces,
   wherein a third piezoelectric element is mounted to the third one of the plurality of second faces, and
   wherein a fourth piezoelectric element is mounted to the fourth one of the plurality of second faces;
   b) mounting a second piezoelectric element to the wall of the vessel at a position adjacent to the base material; and
   c) activating the first piezoelectric element, the second piezoelectric element, the third piezoelectric element, and the fourth piezoelectric element.

* * * * *